(12) United States Patent
Sekiguchi

(10) Patent No.: US 10,603,853 B2
(45) Date of Patent: Mar. 31, 2020

(54) FLAT TIRE REPAIR LIQUID CONTAINER

(71) Applicant: The Yokohama Rubber Co., LTD., Minato-ku, Tokyo (JP)

(72) Inventor: Takumi Sekiguchi, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 160 days.

(21) Appl. No.: 15/553,126

(22) PCT Filed: Feb. 19, 2016

(86) PCT No.: PCT/JP2016/054865
§ 371 (c)(1),
(2) Date: Aug. 23, 2017

(87) PCT Pub. No.: WO2016/136618
PCT Pub. Date: Sep. 1, 2016

(65) Prior Publication Data
US 2018/0244002 A1   Aug. 30, 2018

(30) Foreign Application Priority Data

Feb. 23, 2015  (JP) ................................ 2015-033133

(51) Int. Cl.
*B29C 73/16* (2006.01)
*B29C 73/02* (2006.01)
(Continued)

(52) U.S. Cl.
CPC ............ *B29C 73/166* (2013.01); *B29C 73/02* (2013.01); *B29C 73/025* (2013.01);
(Continued)

(58) Field of Classification Search
CPC ..... B29C 73/166; B29C 73/025; B29C 73/02; B29D 30/0685; B29D 2030/0698; B29D 2030/0697; B60C 25/16
See application file for complete search history.

(56) References Cited

U.S. PATENT DOCUMENTS 5,472,023 A * 12/1995 Fogal, Sr. ............... B60C 19/00
                                                     141/100
8,752,595 B2 * 6/2014 Marini .................. B29C 73/166
                                                     141/38
(Continued)

FOREIGN PATENT DOCUMENTS

CN      203580150     5/2014
EP      3 061 597     8/2016
(Continued)

OTHER PUBLICATIONS

International Search Report for International Application No. PCT/JP2016/054865 dated May 17, 2016, 6 pages, Japan.

*Primary Examiner* — Nicolas A Arnett
(74) *Attorney, Agent, or Firm* — Thorpe North & Western

(57) ABSTRACT

Provided is a flat tire repair liquid container including: a container main body including a container body in which a flat tire repair liquid is stored, and an opening; and a cap including a flow path configured to guide the flat tire repair liquid out of the container. The flow path includes a cylinder portion of which an end of a first side is open toward internal space of the container body and in which a closing plug is slidably inserted, and a dispensing portion branching from the cylinder portion and open to outside the container. The closing plug is configured to close the flow path by being positioned at the end of the first side of the cylinder portion, and to open the flow path by being subjected to pressure inside the container during flat tire repair work and moving to a second side.

12 Claims, 7 Drawing Sheets

(51) Int. Cl.
B29D 30/06 (2006.01)
*B60C 25/00* (2006.01)
(52) U.S. Cl.
CPC .. B29D 30/0685 (2013.01); *B29D 2030/0697* (2013.01); *B29D 2030/0698* (2013.01); *B60C 25/16* (2013.01)

(56) References Cited

U.S. PATENT DOCUMENTS

| | | | |
|---|---|---|---|
| 9,010,383 B2 * | 4/2015 | Nakao | B29C 73/166 |
| | | | 141/38 |
| 9,193,229 B2 * | 11/2015 | Hong | B29C 73/166 |
| 10,086,574 B2 * | 10/2018 | Sekiguchi | B29C 73/166 |
| 2005/0265873 A1 | 12/2005 | Chou | |
| 2013/0068346 A1 | 3/2013 | Ji | |
| 2014/0283949 A1 * | 9/2014 | Hong | B29C 73/166 |
| | | | 141/52 |
| 2017/0043545 A1 | 2/2017 | Naruse | |
| 2018/0304565 A1 * | 10/2018 | Lam | B29C 73/166 |

FOREIGN PATENT DOCUMENTS

| | | |
|---|---|---|
| JP | 2005-344570 | 12/2005 |
| JP | 2012-157974 | 8/2012 |
| JP | 2013-067161 | 4/2013 |
| JP | 3189236 | 2/2014 |
| JP | 2014-205308 | 10/2014 |
| JP | 5682722 | 3/2015 |
| JP | 2015-202678 | 11/2015 |
| WO | WO 2013/040880 | 3/2013 |
| WO | WO 2015/058372 | 4/2015 |
| WO | WO 2015/058438 | 4/2015 |
| WO | WO 2015/159828 | 10/2015 |

* cited by examiner

FLAT TIRE REPAIR LIQUID CONTAINER

TECHNICAL FIELD

The present technology relates to a flat tire repair liquid container, and more particularly relates to a flat tire repair liquid container whereby flow path opening problems can be effectively prevented.

BACKGROUND ART

In recent years, when a tire mounted to a vehicle is punctured, flat tire repair liquid is injected into the tire via the tire valve to temporarily repair the puncture. For example, a flat tire repair kit that is configured to supply flat tire repair liquid stored in the flat tire repair liquid container to the interior of the tire via a tube is employed as an injection device for such flat tire repair liquid. Employing such a flat tire repair kit eliminates the need to provide the vehicle with a spare tire, which makes it possible to save resources and reduce the weight of the vehicle. There is a further advantage that the space in the vehicle where the spare tire would have been provided can be used for other purposes.

A flat tire repair liquid container includes, for example, a container main body including a container body storing a flat tire repair liquid and an opening, and a cap including a mounting portion mounted to the opening during flat tire repair work, a dispensing portion that dispenses the flat tire repair liquid outside of the container, and a flow path that connects the mounting portion to the dispensing portion. In such a configuration, providing a closing plug formed from rubber in the flow path has been proposed as a way of preventing the flat tire repair liquid from leaking out from the flow path during storage (see Japanese Unexamined Patent Application Publication No. 2013-067161A, for example).

With the closing plug proposed in Japanese Unexamined Patent Application Publication No. 2013-067161A, the flow path is opened by pressure of air supplied to the interior of the container during flat tire repair work that moves the closing plug within the flow path to a predetermined position (an end of the flow path positioned toward the outer side of the container). However, typically used closing plugs formed from rubber deform easily and, as such, there is a problem that the closing plug deforms under the pressure of the air when moving within the flow path, becomes stuck in the flow path, blocks the flow path, and prevents the flow path from opening correctly (in other words, an opening problem occurs).

SUMMARY

The present technology provides a flat tire repair liquid container whereby flow path opening problems can be effectively prevented.

A flat tire repair liquid container according to the present technology includes a container main body including a container body in which a flat tire repair liquid is stored, and an opening; and a cap including a flow path configured to guide the flat tire repair liquid in the container out of the container, the cap being mounted on the opening during flat tire repair work. In such a flat tire repair liquid container, the flow path includes a cylinder portion with a cylindrical shape of which an end of a first side is open to internal space of the container body and in which a closing plug is slidably inserted, and a dispensing portion branching from the cylinder portion open to outside the container. Additionally, the closing plug is configured to close the flow path by being positioned at the end of the first side of the cylinder portion, and to open the flow path by being subjected to pressure inside the container during flat tire repair work and moving farther to a second side than a branching location of the cylinder portion with the dispensing portion. Furthermore, a small diameter portion having a diameter smaller than an inner diameter of the cylinder portion is provided at the end of the first side of the cylinder portion.

In the present technology, as described above, the small diameter portion having a diameter smaller than the inner diameter of the cylinder portion is provided at the end of the first side of the cylinder portion. As such, during flat tire repair work, the air flowing into the cylinder portion concentrates in a small area, and the pressure of the air pressing on the closing plug increases. Accordingly, it is possible to reliably move the closing plug. In other words, it is possible to prevent flow path opening problems such as the closing plug becoming stuck in the flow path and blocking the flow path.

In the present technology, a configuration is possible in which the small diameter portion is provided by molding the end on the first side of the cylinder portion in a flange shape facing the center of the cylinder portion such that the inner diameter is made smaller than other portions of the cylinder portion. Alternatively, a configuration is possible in which the small diameter portion is provided by affixing an adapter to the end on the first side of the cylinder portion, the adapter including a small hole with a diameter smaller than an inner diameter of the cylinder portion.

In the present technology, a configuration is preferable in which the closing plug includes a protrusion capable of engaging with the small diameter portion. By providing this protrusion, movement of the closing plug caused by changes in temperature and the like during storage can be suppressed. Additionally, while high pressure is needed to detach the closing plug from the small diameter portion when engaged via the protrusion, this high pressure acts effectively to reliably move the closing plug, which is beneficial for preventing flow path opening problems.

In the present technology, it is preferable that an inner diameter $R2$ is in a range of 35% to 70% of an inner diameter $R1$, where $R1$ is the inner diameter of the cylinder portion, and $R2$ is an inner diameter of the small diameter portion. By sufficiently narrowing the inner diameter of the small diameter portion, the pressure pressing on the closing plug by the air flowing into the cylinder can be made appropriate, which is beneficial for preventing flow path opening problems.

DETAILED DESCRIPTION

Embodiments of the present technology are described in detail below with reference to the accompanying drawings.

Figure 1:
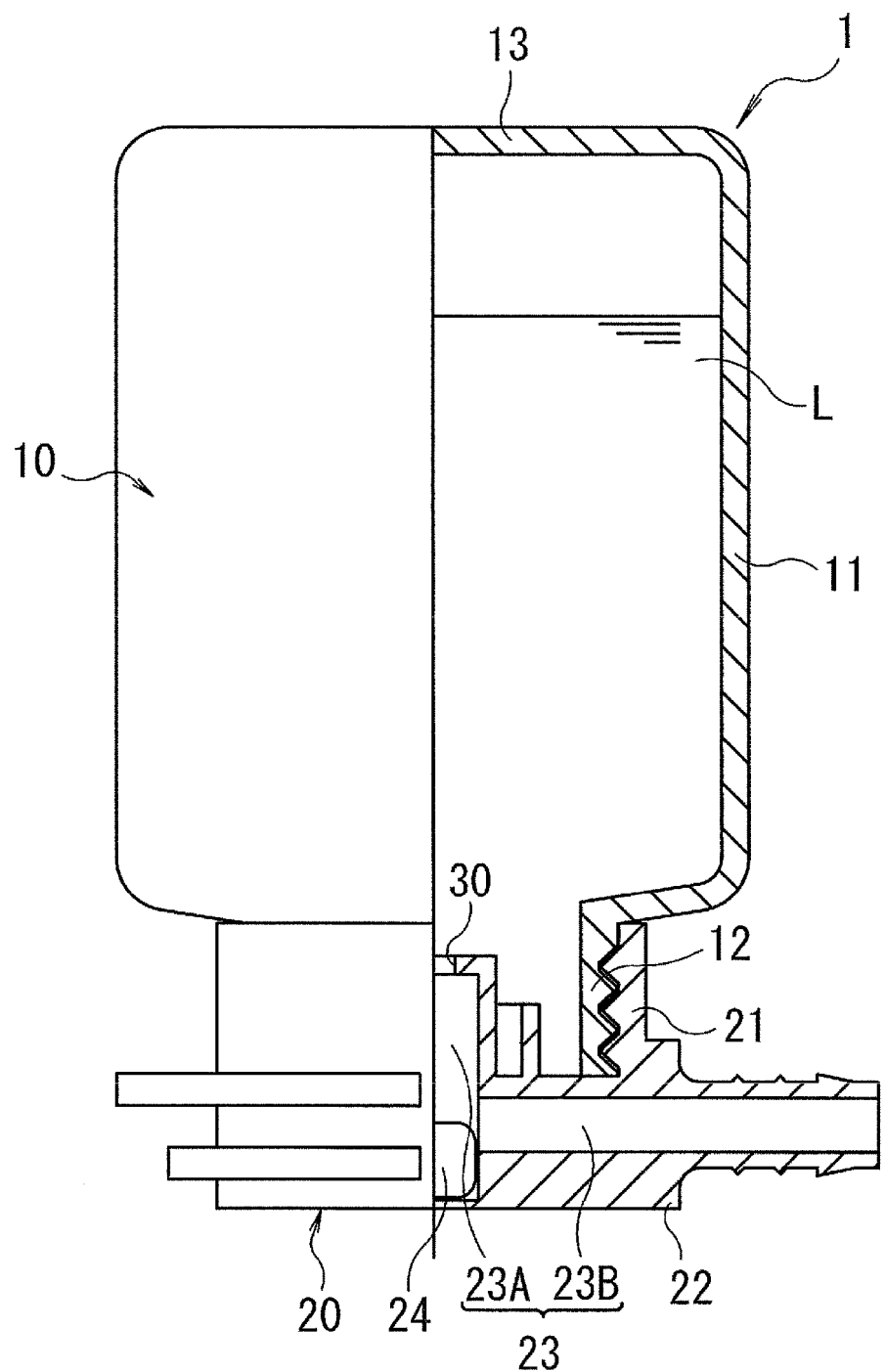
FIG. 1 is front view of a flat tire repair liquid container according an embodiment of the present technology, of which a portion is cut away.

As illustrated in FIG. 1, a flat tire repair liquid container 1 (called a "container 1" hereinafter) according to the present technology is constituted of a container main body 10 and a cap 20.

The container main body 10 includes a cylindrical container body 11 storing flat tire repair liquid L (called "repair liquid L" hereinafter) that contains, for example, rubber latex, and a cylindrical opening 12 that is positioned on a lower side of the container body 11 when the container main body 10 is inverted and through which the repair liquid L is dispensed during use. When the container 1 is inverted, a bottom 13 of the container body 11 is positioned on a side opposite the opening 12. The opening 12 is sealed by a film (not illustrated). In this embodiment, a screw thread is formed on the outer surface of the opening 12 so as to mate with a screw thread on the cap 20, which will be described later. The container body 11, the opening 12, and the bottom 13 are integrally formed from, for example, a synthetic resin such as polyethylene.

Figure 2:
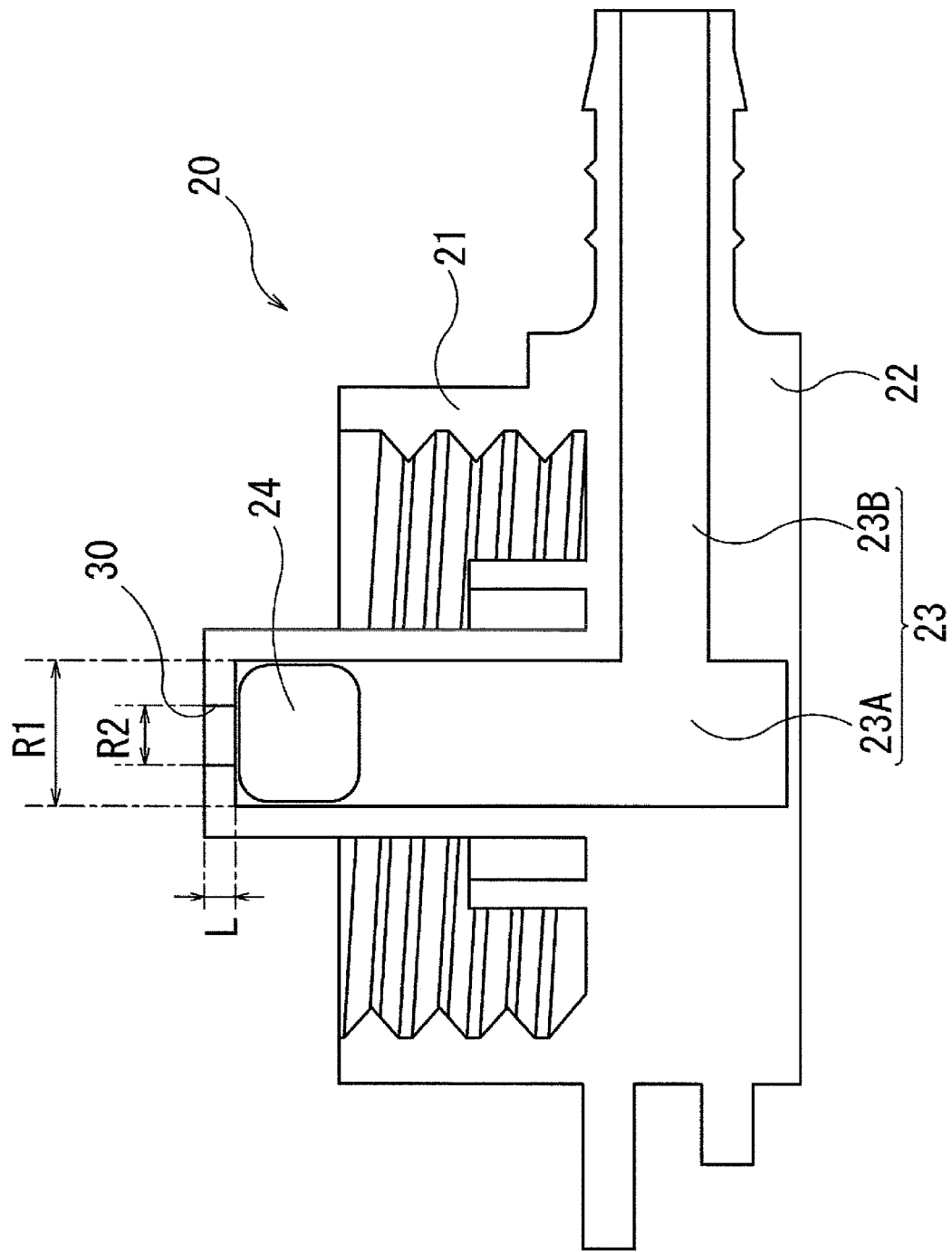
FIG. 2 is an enlarged cross-sectional view illustrating a cap (when a valve is closed) included in the flat tire repair liquid container illustrated in FIG. 1.
Figure 3:
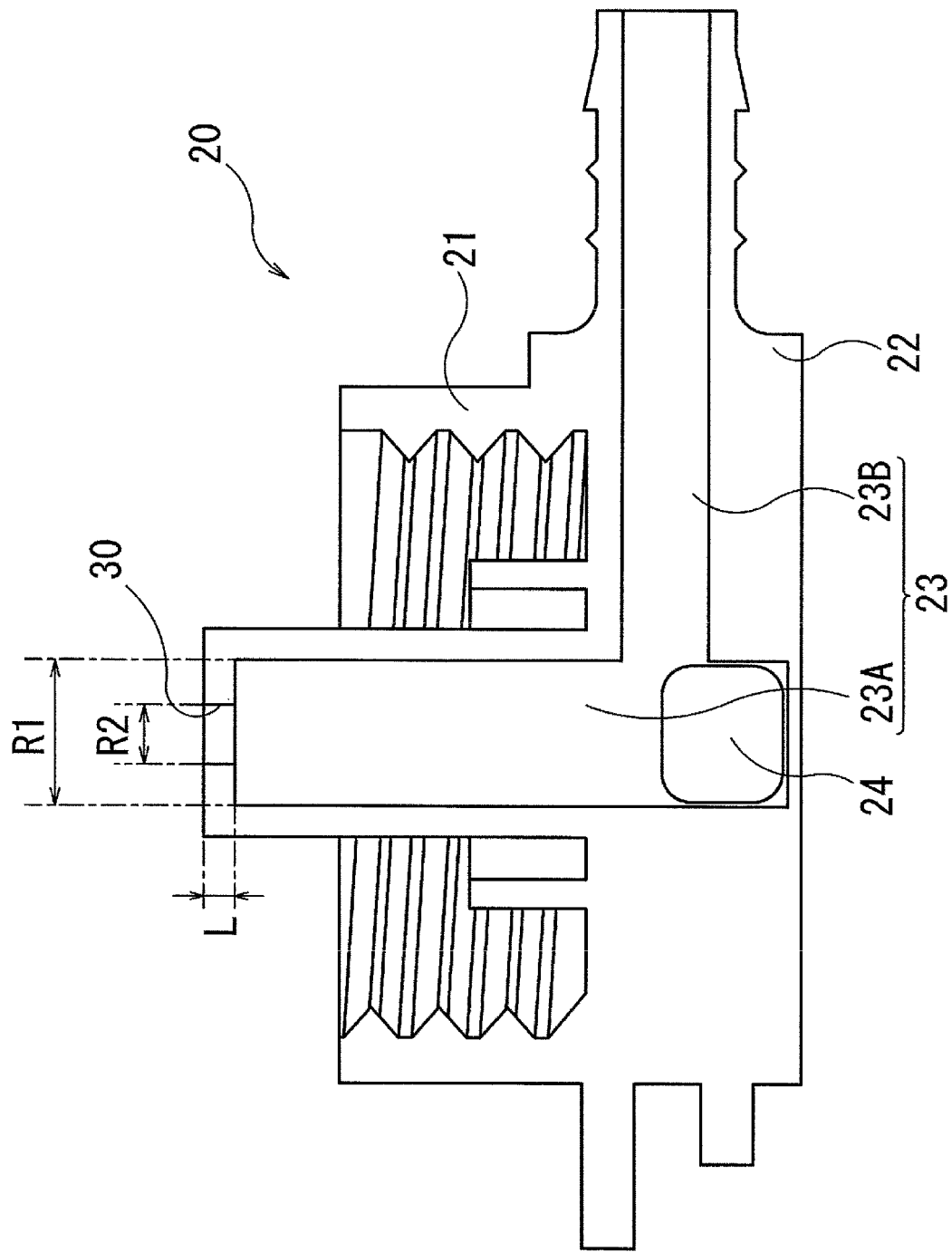
FIG. 3 is an enlarged cross-sectional view illustrating the cap (when the valve is open) included in the flat tire repair liquid container illustrated in FIG. 1.

As illustrated in FIGS. 1 to 3, the cap 20 is constituted of a mounting portion 21 mounted on the opening 12 of the container main body 10 during flat tire repair work, and a base portion 22 that contacts the road surface or the like and serves as a base of the entire container 1 when the container 1 is inverted during use. Additionally, a flow path 23 for guiding the repair liquid L out of the container 1 is provided in the interior of the cap 20. The mounting portion 21 has a cylindrical shape and screw threads formed on the inner circumferential surface thereof that mate with screw threads on the opening 12 of the container main body 10. In the illustrated embodiment, the mounting portion 21 and the base portion 22 have cylindrical shapes with substantially identical diameters, and the mounting portion 21 and the base portion 22 are formed integrally. In contrast, the flow path 23 is primarily formed as a cylindrical hole drilled in the interior of the base portion 22 and, in the illustrated embodiment, is constituted of a cylinder portion 23A extending in an axial direction (the vertical direction in the drawings) of the container 1 and a dispensing portion 23B branching from the cylinder portion 23A and extending in a direction (the horizontal direction in the drawings) orthogonal to the axis of the container 1.

An end of a first side of the cylinder portion 23A protrudes toward the internal space of the container body 11 and is open to the internal space of the container body 11. Additionally, a closing plug 24 is slidably inserted in the cylinder portion 23A. As described above, the dispensing portion 23B branches from the cylinder portion 23A partway along the cylinder portion 23A and opens to the outside of the container. In the illustrated embodiment, the end of the dispensing portion 23B on the container outside protrudes outward from the base portion 22, and a hose (described later; not illustrated in FIGS. 1 to 3) is connected to this protruding portion during use. The closing plug 24 is configured with a shape that is capable of sliding in the cylinder portion 23A and, as illustrated in FIG. 2, closes the flow path 23 by being positioned at the end of the first side of the cylinder portion 23A, and opens the flow path 23 by being subjected to the pressure inside the container during flat tire repair work and moving in the cylinder portion 23A so as to be positioned farther to a second side (end of a second side) than the branching location of the cylinder portion 23A with the dispensing portion 23B, as illustrated in FIG. 3. Examples of the material of the closing plug 24 include rubber and thermoplastic resins, of which rubber with a hardness of 45 or higher is preferable.

The present technology prevents opening problems of the flow path 23 in the flat tire repair liquid container 1 described above by applying the specific configuration of the flow path 23 (particularly, the cylinder portion 23A) and the closing plug 24. As such, the overall structure of the flat tire repair liquid container 1, with the exception of the flow path 23 and the closing plug 24, is not limited to the form described above.

In the present technology, a small diameter portion 30 with a diameter smaller than the inner diameter of the cylinder portion 23A is provided at the end of the first side of the cylinder portion 23A, as illustrated in FIGS. 1 to 3. Particularly, in the embodiment illustrated in FIGS. 1 to 3, the end on the first side of the cylinder portion 23A is molded in a flange shape facing the center of the cylinder portion 23A such that the inner diameter is made smaller than the other portions of the cylinder portion 23A. Thus, the small diameter portion 30 is provided.

Thus, the small diameter portion 30 having a diameter smaller than the inner diameter of the cylinder portion 23A is provided at the end of the first side of the cylinder portion 23A. As such, during flat tire repair work, the air flowing into the cylinder portion 23A concentrates in a small area, and the pressure of the air pressing on the closing plug 24 increases. Accordingly, it is possible to reliably move the closing plug 24. In other words, it is possible to prevent opening problems of the flow path 23 such as the closing plug 24 becoming stuck in the flow path 23 (the cylinder portion 23A) and blocking the flow path 23.

Here, it is preferable that an inner diameter R2 is in a range of 35% to 70% of an inner diameter R1, where R1 is the inner diameter of the cylinder portion 23A (the portions which do not include the small diameter portion 30), and R2 is an inner diameter of the small diameter portion 30. More preferably, the inner diameter R2 is set to a range of 40% to 65% of the inner diameter R1. By sufficiently narrowing the inner diameter of the small diameter portion 30, the pressure pressing on the closing plug 24 by the air flowing into the cylinder portion 23A can be made appropriate, which is beneficial for preventing opening problems of the flow path 23. Here, if the inner diameter R2 is smaller than 35% of the inner diameter R1, the flow path 23 will be excessively narrow at the small diameter portion 30 and, as a result, the flat tire repair liquid L will flow less easily after the flow path 23 is opened. If the inner diameter R2 is greater than 70% of the inner diameter R1, the pressure pressing on the closing plug 24 by the air flowing into the cylinder portion 23A cannot be increased and the effects of preventing opening problems cannot be satisfactorily obtained.

A length L of the small diameter portion 30 in the axial direction of the container 1 is not particularly limited but, from the perspective of the structure of the cap, can be set to 1 mm or greater, for example. If the length L is less than 1 mm, the portion of the small diameter portion 30 projecting in a flange shape toward the center of the cylinder portion 23A will be excessively thin and, thus, durability of this portion will decline. Note that the upper limit of the length L is not particularly limited, but if the length L becomes significantly large, resulting in a structure where the position of the closing plug 24 when closed is near the flow path 23B, liquid leakage may occur with slight movements of the closing plug caused by changes in temperature or the like during storage. As such, it is preferable that the upper limit of the length L is set such that a distance of at least 6 mm, from the end of the closing plug 24 on the flow path 23 side to the flow path 23, can be secured.

Figure 4:
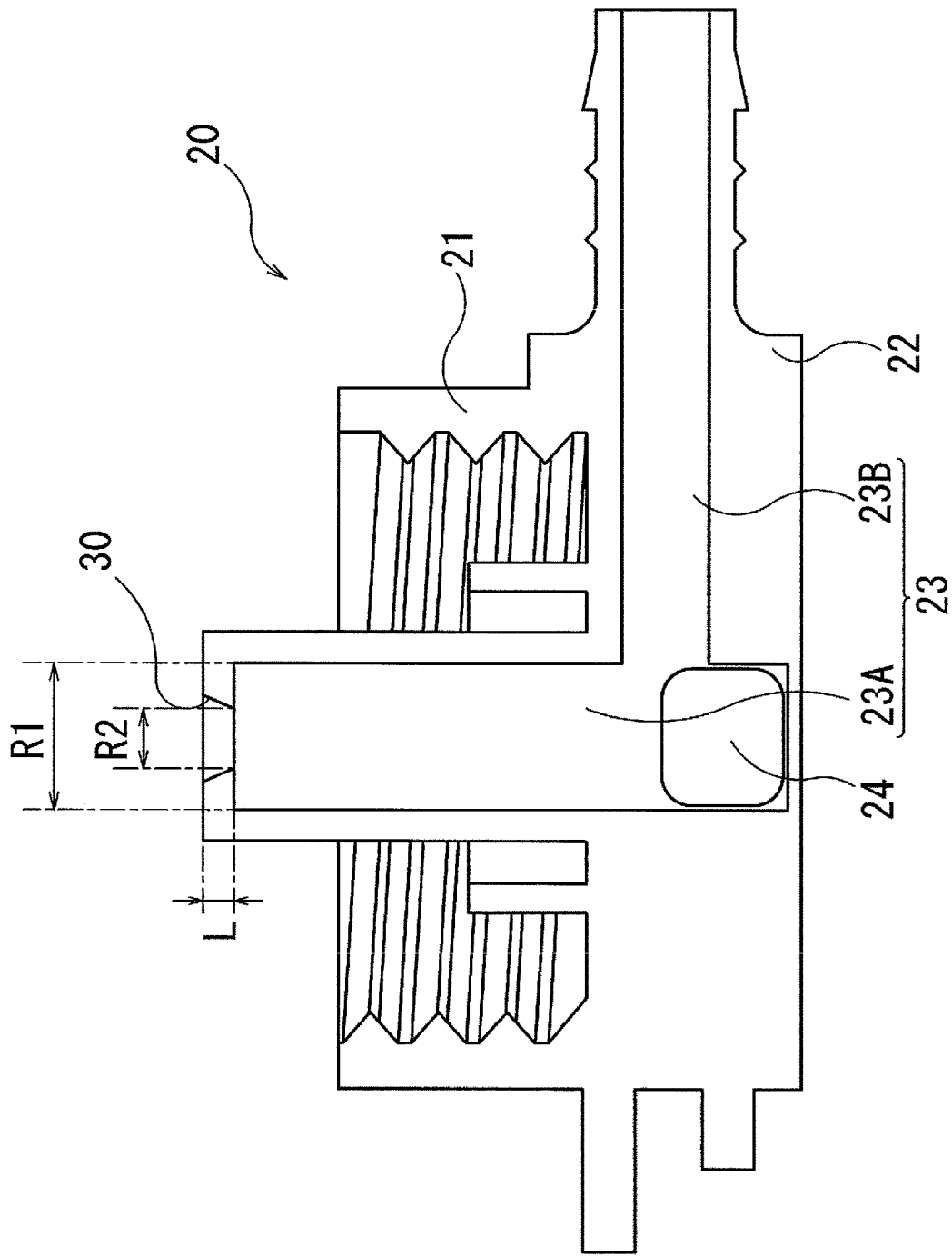
FIG. 4 is an enlarged cross-sectional view illustrating the cap (when the valve is open) included in a flat tire repair liquid container according to another embodiment of the present technology.

The inner diameter R2 of the small diameter portion 30 need not be constant. For example, as illustrated in FIG. 4, a configuration is possible in which the small diameter portion 30 has a shape where the inner diameter R2 becomes gradually smaller toward the inflow direction. With such a shape, the force of the air flowing into the cylinder portion 23A can be increased, which is beneficial for preventing flow path opening problems. Note that it is preferable that the relationship with the inner diameter R1 described above remains satisfied even in cases where the inner diameter R2 changes. It is particularly preferable that the minimum value of the inner diameter R2 satisfies the relationship described above.

Figure 5:
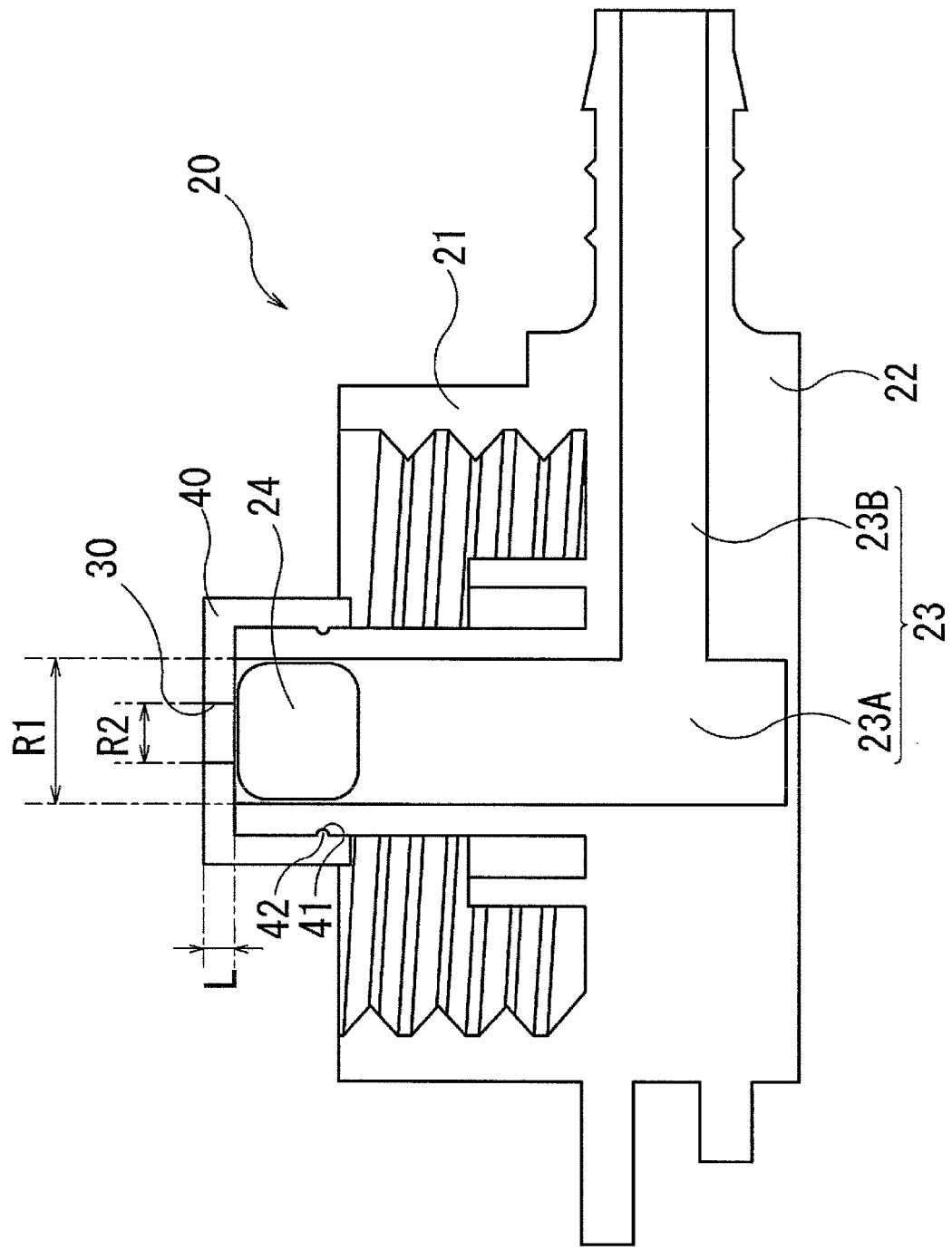
FIG. 5 is an enlarged cross-sectional view illustrating the cap (when the valve is closed) included in the flat tire repair liquid container according to the other embodiment of the present technology.

In the example described above, the small diameter portion 30 is formed integrally with the cylinder portion 23A but, for example, a configuration is possible in which the small diameter portion 30 is provided by affixing an adapter 40 to the end on the first side of the cylinder portion 23A, the adapter 40 including a small hole (the small diameter portion 30) with a diameter smaller than the inner diameter of the cylinder portion 23A. Particularly, in the example illustrated in FIG. 5, the adapter 40 has a cylindrical shape with an inner side hollowed out so as to cover the outer side of the portion of the cylinder portion 23A protruding in the container body 11. Additionally, a small hole (the small diameter portion 30) is provided at the end that faces the internal space of the container body 11 when the adapter 40 is affixed to the end of the cylinder portion 23A. Moreover, with the adapter 40 illustrated in FIG. 5, recesses 41 are provided on the outer surface of the cylinder portion 23A and protrusions 42 that fit into the recesses 41 are provided on the inner surface of the adapter 40. Thereby, the adapter 40 can be reliably affixed to the end of the cylinder portion 23A.

Even when using such an adapter 40, due to the small hole (the small diameter portion 30), during flat tire repair work, the air flowing into the cylinder portion 23A concentrates in the small area of the small hole (the small diameter portion 30) and the pressure pressing on the closing plug 24 increases. Thus, it is possible to reliably move the closing plug 24. Here, it is preferable that the inner diameter R1 of the cylinder portion 23A and the inner diameter R2 of the small hole (the small diameter portion 30) satisfy the relationship described above. Additionally, it is preferable that the thickness of the adapter 40, particularly, the thickness of the end that faces the internal space of the container body 11 (that is, the length L of the small diameter portion 30) is within the range described above. Of course, as in the case described above, the small hole (the small diameter portion 30) may be configured with a shape where the inner diameter R2 gradually decreases toward the inflow direction.

Figure 6:
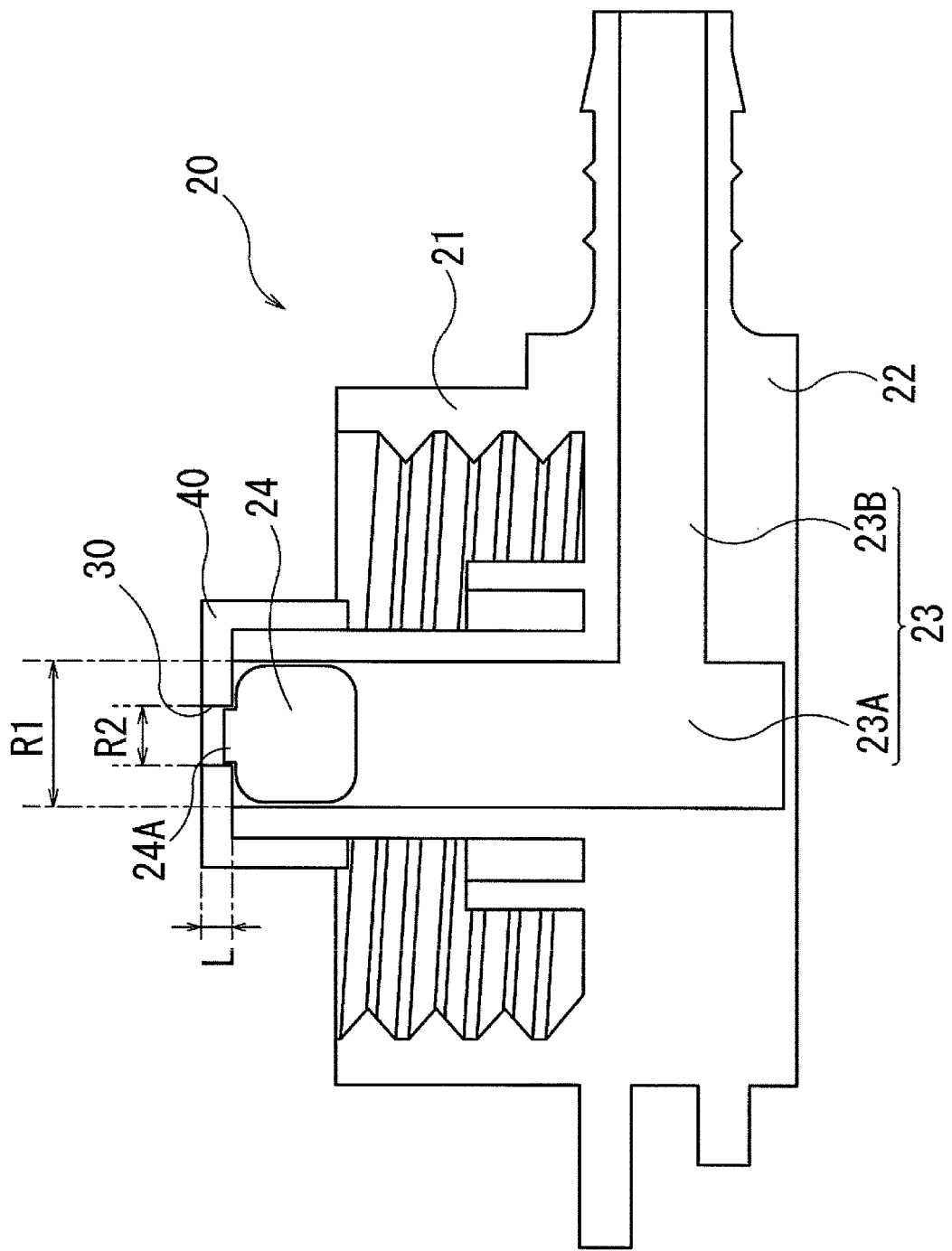
FIG. 6 is an enlarged cross-sectional view illustrating the cap (when the valve is closed) included in a flat tire repair liquid container according to another embodiment of the present technology.

In each of the examples illustrated in FIGS. 1 to 5, the closing plug 24 can close the flow path 23 at the end of the first side of the cylinder portion 23A and has a cylindrical shape with rounded corners so that the closing plug 24 can slide in the cylinder portion 23A. However, for example, a configuration is possible in which a protrusion 24A capable of engaging with the small diameter portion 30 is provided on the closing plug 24, as illustrated in FIG. 6. Specifically, in the embodiment illustrated in FIG. 6, the closing plug 24 includes a protrusion 24A on a surface of the closing plug 24 that becomes the small diameter portion 30 side when the closing plug 24 is positioned at the end of the first side of the cylinder portion 23A. In this configuration, the protrusion 24A has a shape that engages with the small diameter portion 30 and protrudes to the small diameter portion 30 side. By providing this protrusion 24A, movement of the closing plug 24 caused by changes in temperature and the like during storage can be suppressed. Additionally, while high pressure is needed to detach the closing plug 24 from the small diameter portion 30 when engaged via the protrusion 24A, this high pressure acts effectively to reliably move the closing plug 24, which is beneficial for preventing opening problems of the flow path 23. Furthermore, a threshold value of the pressure at which the closing plug 24 begins to move can easily be set by adjusting an insertion amount of the protrusion 24A into the small diameter portion 30.

This closing plug 24 having the protrusion 24A can be used in both cases where the small diameter portion 30 is formed integrally with the cylinder portion 23A and cases where the adapter 40 is used. However, as illustrated in FIG. 6, when used in combination with the adapter 40, a cap in a closed state can easily be manufactured by simply affixing a pre-combined adapter 40 and closing plug 24 to the end of the first side of the cylinder portion 23A.

Although the pressure inside the container is approximately equal to atmospheric pressure at normal temperature, the pressure inside the container tends to increase depending on temperature conditions or the like (that is, higher temperatures) when the container is stored within the trunk or the like of the vehicle. As such, it is necessary for the closing plug 24 to be engaged securely, even under conditions where the pressure inside the container is increased during storage. Specifically, the closing plug 24 is preferably configured to start moving in the flow path 23 (the cylinder portion 23A) when the pressure inside the container reaches 350 kPa or higher, for example.

Figure 7:
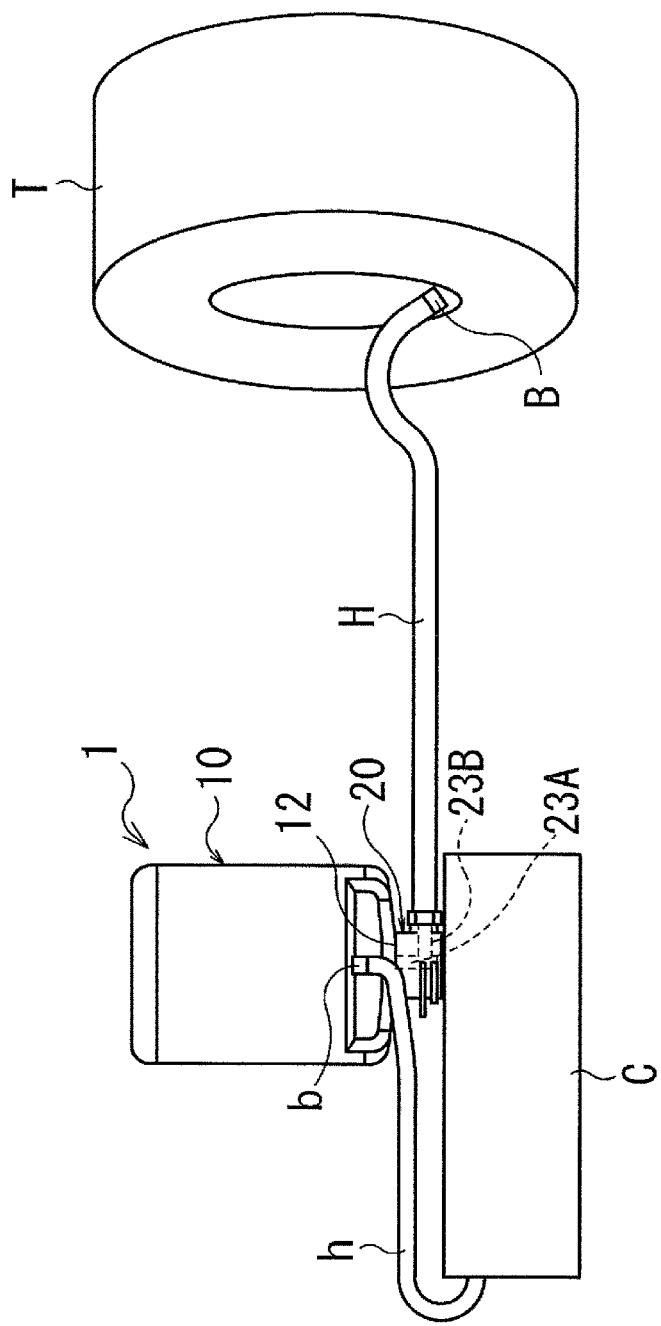
FIG. 7 is an explanatory diagram schematically illustrating the flat tire repair liquid container according to the present technology, while in use.

A method for injecting the flat tire repair liquid L (flat tire repair work) using the flat tire repair liquid container 1 constituted of the container main body 10 and the cap 20 will be described below. Note that FIG. 7 schematically illustrates the flat tire repair liquid container 1, while in use.

During flat tire repair work, the cap 20 is attached to the container main body 10. Note that in the case where a storage cap is already attached to the opening 12 of the container main body 10, the storage cap is replaced with the cap 20. At this time, in the case where a film covers the opening 12, the film is removed or broken. Meanwhile, an end of a first side of a hose H is fixed to the end on the container outside of the dispensing portion 23B of the cap 20 and an end of a second side of the hose H is fixed to a valve B of a tire T, thus connecting the valve B of the tire T and the container 1. In addition, a compressor C is connected to the container 1 (in the case of FIG. 7, the compressor C is connected to a valve b provided in the container main body 10 by a hose h). Then, the container 1 connected to the tire T via the hose H is placed in an inverted state, with the opening 12 oriented downward (the state illustrated in FIG. 7), and the compressor C supplies air to the interior of the container main body 10. The pressure inside the container rises due to the supplied air, and when a predetermined pressure (e.g. 350 kPa or higher) is reached, the closing plug 24 moves within the flow path 23 (the cylinder portion 23A) toward the outer side of the container, and the flow path 23 opens (in other words, the state illustrated in FIG. 1 is reached). Then, the repair liquid L is supplied from the container main body 10 through the opened flow path 23, and is injected into the tire T via the hose H. In this manner, all of the flat tire repair liquid L within the container 2 is injected into the tire T.

Thus, with the method of injecting the flat tire repair liquid L using the flat tire repair container 1 (flat tire repair work) of the present technology, the advantageous effects caused by providing the small diameter portion 30 having a diameter smaller than the inner diameter of the cylinder portion 23A at the end of the first side of the cylinder portion 23A, that is, the advantageous effects of preventing opening problems of the flow path 23 can be obtained.

EXAMPLES

Seven types of test containers for Conventional Example 1 and Examples 1 to 6 were fabricated using the flat tire repair liquid container illustrated in FIG. 1 in which the container main body was made from plastic with a thickness of approximately 2 mm, and had a flat tire repair liquid capacity of 350 mL. Caps with differing configurations on the points of the presence or absence of the small diameter portion of the cylinder portion, the ratio of the inner diameter R2 of the small diameter portion to the inner diameter R1 of the cylinder portion, and the presence or absence of the protrusion on the closing plug were combined with the container main body.

Note that Conventional Example 1 is an example where the small diameter portion is not provided and, as such, the inner diameter at the end of the cylinder portion on the interior space side of the container main body is the same as that of the other portions of the cylinder portion. For the sake of comparison, the inner diameter at the end of the cylinder portion on the interior space side of the container main body is considered to be the inner diameter R2 of the small diameter portion. Therefore, the value (100%) was recorded in the "Inner diameter R2 of the small diameter portion" row in Table 1.

Using these seven types of test containers and according to the method illustrated in FIG. 7, compressed air (pressure: 350 kPa) was supplied from a compressor to a pneumatic tire (tire size: 195/65R15) for which the air pressure had been adjusted to 0.0 kPa. The flat tire repair liquid in the container was injected into the tire together with the compressed air, and the time required (injection time) to inject all of the flat tire repair liquid in the container into the tire was measured. This measurement was performed five times for each example and the averages thereof were taken. Note that two types of measurement were performed, namely, measurement when the temperature of the flat tire repair liquid in the container was room temperature (20° C.; injection time at room temperature), and when the temperature of the flat tire repair liquid in the container was 70° C. (injection time at 70° C.). The evaluation results were indexed using the inverse of the measurement values, Conventional Example 1 being assigned an index value of 100. Smaller values indicate shorter injection time, easier movement of the closing plug, and less likelihood of the occurrence of flow path opening problems.

TABLE 1

|  |  | Conventional Example 1 | Example 1 | Example 2 | Example 3 | Example 4 | Example 5 | Example 6 |
|---|---|---|---|---|---|---|---|---|
| Presence/absence of small diameter portion |  | Absent | Present | Present | Present | Present | Present | Present |
| Inner diameter R2 of small diameter portion | % | (100) | 70 | 65 | 50 | 40 | 35 | 50 |
| Presence/absence of protrusion |  | Absent | Absent | Absent | Absent | Absent | Absent | Present |
| Injection time at room temperature | Index value | 100 | 85 | 85 | 90 | 98 | 102 | 90 |
| Injection time at 70° C. | Index value | 100 | 70 | 70 | 80 | 90 | 98 | 80 |

It is clear from Table 1 that in each of Examples 1 to 4 and 6, injection time was shorter compared to Conventional Example 1. That is, the closing plug moved easier and it was possible to reliably open the flow path. Particularly, excellent results were observed in Examples 2 to 4 in which the inner diameter R2 of the small diameter portion was set in the suitable range, and in Example 6 in which the protrusion was provided on the closing plug. Additionally, with Example 5, while injection time at room temperature was slightly worse than Conventional Example 1, injection time at 70° C., which is closer to actual use conditions (that is, a state where the container is stored within the trunk or the like of a vehicle, resulting in a higher internal temperature of the container), was shorter than Conventional Example 1.

In a comparison of the injection times at room temperature and the injection times at 70° C. in Table 1, it is clear that the injection time was significantly enhanced when the temperature of the flat tire repair liquid was higher. Thus, it is clear that the present technology will function effectively in cases such as where the flat tire repair liquid container is stored within the trunk or the like of a vehicle, resulting in a higher internal temperature of the container. Note that in the examples described above, the small diameter portion was formed integrally with the cylinder portion, but the same results were obtained when performing the same tests using caps in which the small diameter portion was provided using an adapter having a small hole (small diameter portion).

The invention claimed is:

1. A flat tire repair liquid container, comprising:
   a container main body including a container body in which a flat tire repair liquid is stored, and an opening; and
   a cap including a flow path configured to guide the flat tire repair liquid in the container out of the container, the cap being mounted on the opening during flat tire repair work;
   the flow path including a cylinder portion with a cylindrical shape of which an end of a first side is open toward internal space of the container body and in which a closing plug is slidably inserted, and a dispensing portion branching from the cylinder portion and open to outside the container;
   the closing plug being configured to close the flow path by being positioned at the end of the first side of the cylinder portion, and to open the flow path by being subjected to container internal pressure during flat tire repair work and moving farther to a second side than a branching location of the cylinder portion with the dispensing portion; and
   a small diameter portion having a diameter smaller than an inner diameter of the cylinder portion is provided at the end of the first side of the cylinder portion.

2. The flat tire repair liquid container according to claim 1, wherein:
   the small diameter portion is provided by molding the end on the first side of the cylinder portion in a flange shape facing a center of the cylinder portion such that the inner diameter is made smaller than other portions of the cylinder portion.

3. The flat tire repair liquid container according to claim 2, wherein:
   the closing plug includes a protrusion capable of engaging with the small diameter portion.

4. The flat tire repair liquid container according to claim 3, wherein:
   an inner diameter R2 is in a range of 35% to 70% of an inner diameter R1, where R1 is the inner diameter of the cylinder portion, and R2 is an inner diameter of the small diameter portion.

5. The flat tire repair liquid container according to claim 2, wherein:
   an inner diameter R2 is in a range of 35% to 70% of an inner diameter R1, where R1 is the inner diameter of the cylinder portion, and R2 is an inner diameter of the small diameter portion.

6. The flat tire repair liquid container according to claim 1, wherein:
   the small diameter portion is provided by affixing an adapter to the end on the first side of the cylinder portion, the adapter including a small hole with a diameter smaller than an inner diameter of the cylinder portion.

7. The flat tire repair liquid container according to claim 6, wherein:
   the closing plug includes a protrusion capable of engaging with the small diameter portion.

8. The flat tire repair liquid container according to claim 7, wherein:
   an inner diameter R2 is in a range of 35% to 70% of an inner diameter R1, where R1 is the inner diameter of the cylinder portion, and R2 is an inner diameter of the small diameter portion.

9. The flat tire repair liquid container according to claim 6, wherein:
   an inner diameter R2 is in a range of 35% to 70% of an inner diameter R1, where R1 is the inner diameter of the cylinder portion, and R2 is an inner diameter of the small diameter portion.

10. The flat tire repair liquid container according to claim 1, wherein:
    the closing plug includes a protrusion capable of engaging with the small diameter portion.

11. The flat tire repair liquid container according to claim 10, wherein:
    an inner diameter R2 is in a range of 35% to 70% of an inner diameter R1, where R1 is the inner diameter of the cylinder portion, and R2 is an inner diameter of the small diameter portion.

12. The flat tire repair liquid container according to claim 1, wherein:
    an inner diameter R2 is in a range of 35% to 70% of an inner diameter R1, where R1 is the inner diameter of the cylinder portion, and R2 is an inner diameter of the small diameter portion.

* * * * *